G. Q. DEWEY.
NUT LOCK.
APPLICATION FILED SEPT. 10, 1912.
1,083,877.
Patented Jan. 6, 1914.
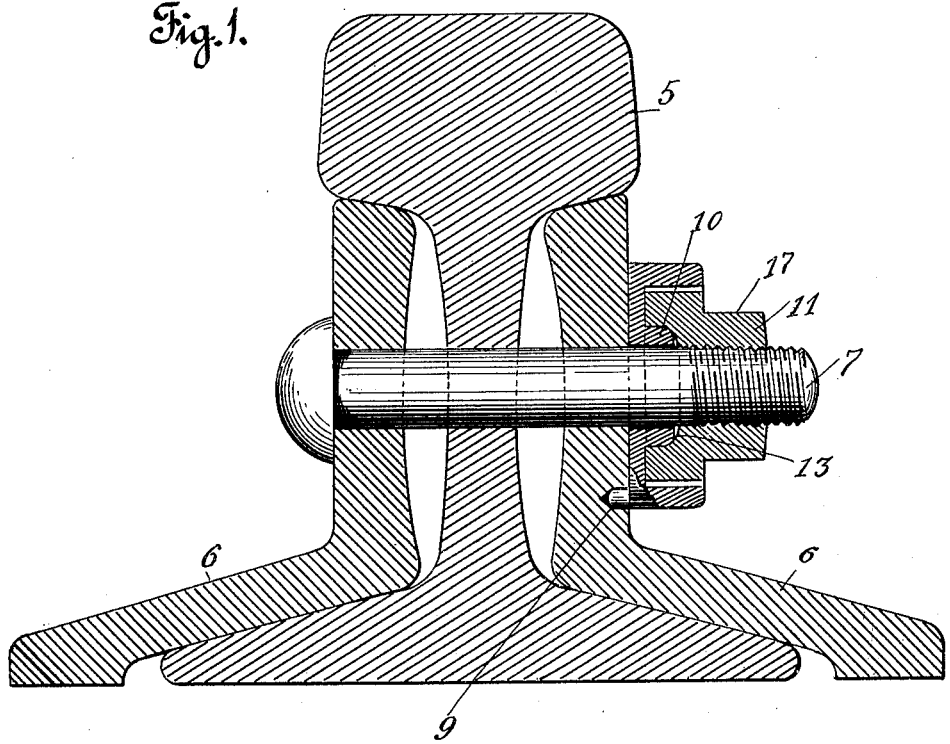
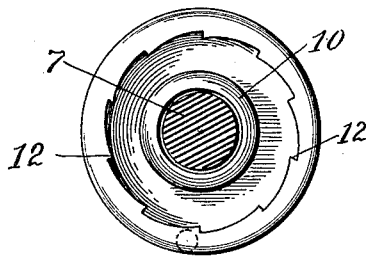
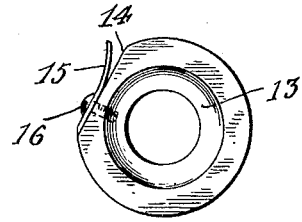
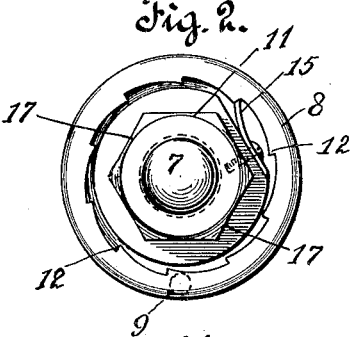
Witnesses.
Inventor,
George Q. Dewey,
Hazard & Strauss
Attorneys.

UNITED STATES PATENT OFFICE.

GEORGE Q. DEWEY, OF BURBANK, CALIFORNIA.

NUT-LOCK.

1,083,877.　　　Specification of Letters Patent.　　Patented Jan. 6, 1914.

Application filed September 10, 1912. Serial No. 719,551.

*To all whom it may concern:*

Be it known that I, GEORGE Q. DEWEY, a citizen of the United States, residing at Burbank, in the county of Los Angeles and State of California, have invented a new and useful Improvement in Nut-Locks, of which the following is a specification.

This invention relates to nut locks, and the object is to provide a nut lock with pawl and ratchet locking means, the ratchet being rigidly secured to the structure on which the device is used, the nut being pivotally mounted in relation to the ratchet.

In the drawings accompanying this specification and forming therewith the application for Letters Patent: Figure 1 is a transverse cross section of a rail and rail joints, showing the invention applied thereto, the nut lock being also in section. Fig. 2 is an end elevation of the nut and the locking means. Fig. 3 is a front elevation of the ratchet socket, the bolt being shown in cross section. Fig. 4 is a detail of the inner face of the nut, showing the concentric groove formed adjacent the threaded bore.

Heretofore in the use of nut locks difficulty has been experienced in concentrically locating the securing means in relation to the nut and the bolt, resulting in inefficiency and irregularity in the operation of the locking means.

This invention overcomes the above objections and provides means by which the nut is concentrically held in relation to the locking means.

More specifically in the drawings, 5 designates a rail to which are secured the rail joints 6 by means of the bolt 7 this bolt being of the ordinary common type. Before the nut is applied the socket 8 is slipped over the threaded end of the bolt, the stud 9 projecting from the face engaging the rail joint being provided to prevent rotation of the socket member 8, a suitable recess having been drilled in the fish plate at the proper location to receive the stud 9.

Concentrically formed with the opening registering with and tightly fitting the bolt 7 is the annular flange 10, which extends outwardly a sufficient distance from the inner face of the socket to engage and register with a recess cut in the nut 11. The outer edge of the socket preferably extends beyond the flange 10 and is provided with the teeth 12 on the inner periphery of the rim, these teeth facing in such a direction as to engage a pawl on the nut to prevent rotation in the reverse direction, the view of Fig. 3 showing teeth that will prevent reverse rotation of a left-handed screw thread, and Fig. 2 showing one in which the reverse rotation is prevented in a right-handed screw thread. The nut 11 is next applied, an annular recess 13 therein registering with and conforming to the annular flange 10, the portion of the nut inclosed within the socket being preferably circular, one portion of the periphery being cut away at the point 14 to form a flat bearing surface for the spring pawl 15, this pawl being rigidly secured by the screw 16 or other well known means to the nut. The pawl 15 is preferably formed of a flat piece of spring steel, or other metal, preferably of the same width as the depth of the socket. The spring tension is such that it bears upon and engages with the teeth 12 on the inner periphery of the socket rim. Suitable wrench engaging faces 17 are formed on the body of the nut external to the circular flange formed on the nut so that these wrench faces clear the outer rim of the socket.

As will readily be seen this invention provides an efficient nut lock that is quickly and easily applied, and by forcing the spring 15 out of engagement with the teeth the nut may be removed with facility, and the correct relation of the nut 17 to the socket is assured by the concentric flange 10, should the bolt as frequently found not be true, or form a concentric fit in the bore through the socket member.

What I claim is:

A nut lock, comprising a socket provided with an inner toothed periphery and a bolt opening concentrically placed therein, an annular flange adjacent said bolt opening, a stud on the face opposite said annular flange and toothed periphery, a flanged nut provided with wrench engaging faces and a recess oppositely disposed to said wrench faces and concentric to the bolt opening therein to engage said annular flange, the periphery of said flanged nut being flattened at one portion, and a spring pawl secured to the flattened portion of the periphery of
5 said flanged nut to register and engage with the inner toothed periphery of said socket.

In witness that I claim the foregoing I have hereunto subscribed my name this 31st day of August, 1912.

GEORGE Q. DEWEY.

Witnesses:
M. BATTEY,
EARLE R. POLLARD.

Copies of this patent may be obtained for five cents each, by addressing the "Commissioner of Patents, Washington, D. C."